Feb. 29, 1944.  J. B. ARMITAGE ET AL  2,342,828
METHOD AND APPARATUS FOR ALIGNING MACHINE ELEMENTS AND THE LIKE
Filed May 13, 1939  4 Sheets-Sheet 3
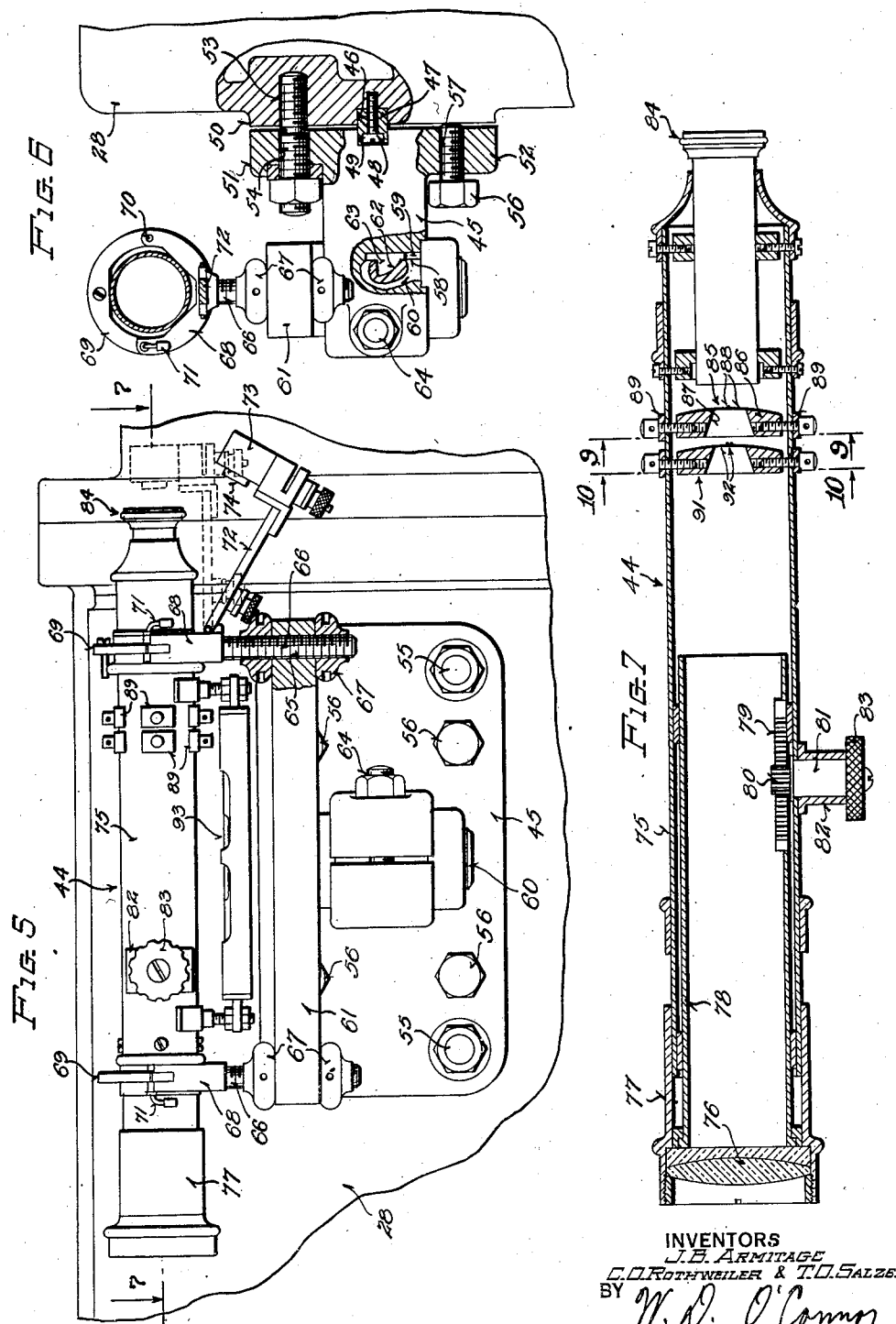
INVENTORS
J.B. ARMITAGE
C.O.ROTHWEILER & T.O.SALZER
BY W. D. O'Connor
ATTORNEY Feb. 29, 1944. J. B. ARMITAGE ET AL 2,342,828
METHOD AND APPARATUS FOR ALIGNING MACHINE ELEMENTS AND THE LIKE
Filed May 13, 1939 4 Sheets-Sheet 4
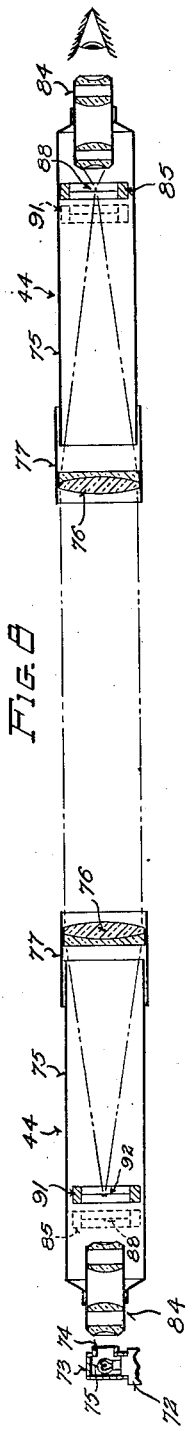
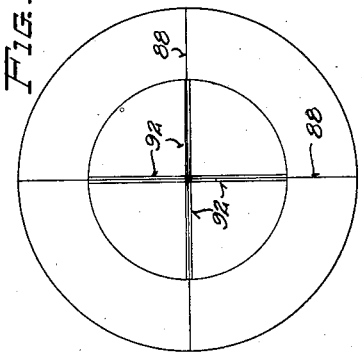
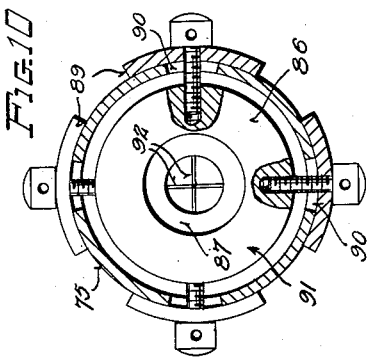
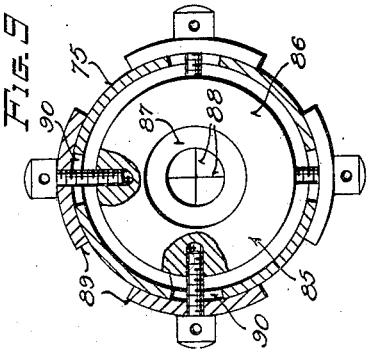
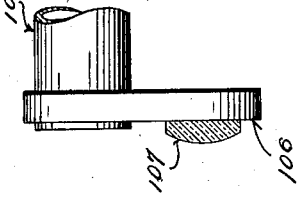
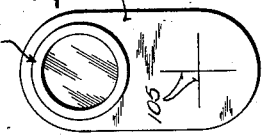
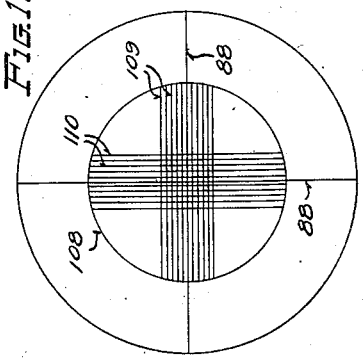
INVENTORS
J.B. Armitage
C.O. Rothweiler & T.O. Salzer
BY
W. D. O'Connor
ATTORNEY Patented Feb. 29, 1944

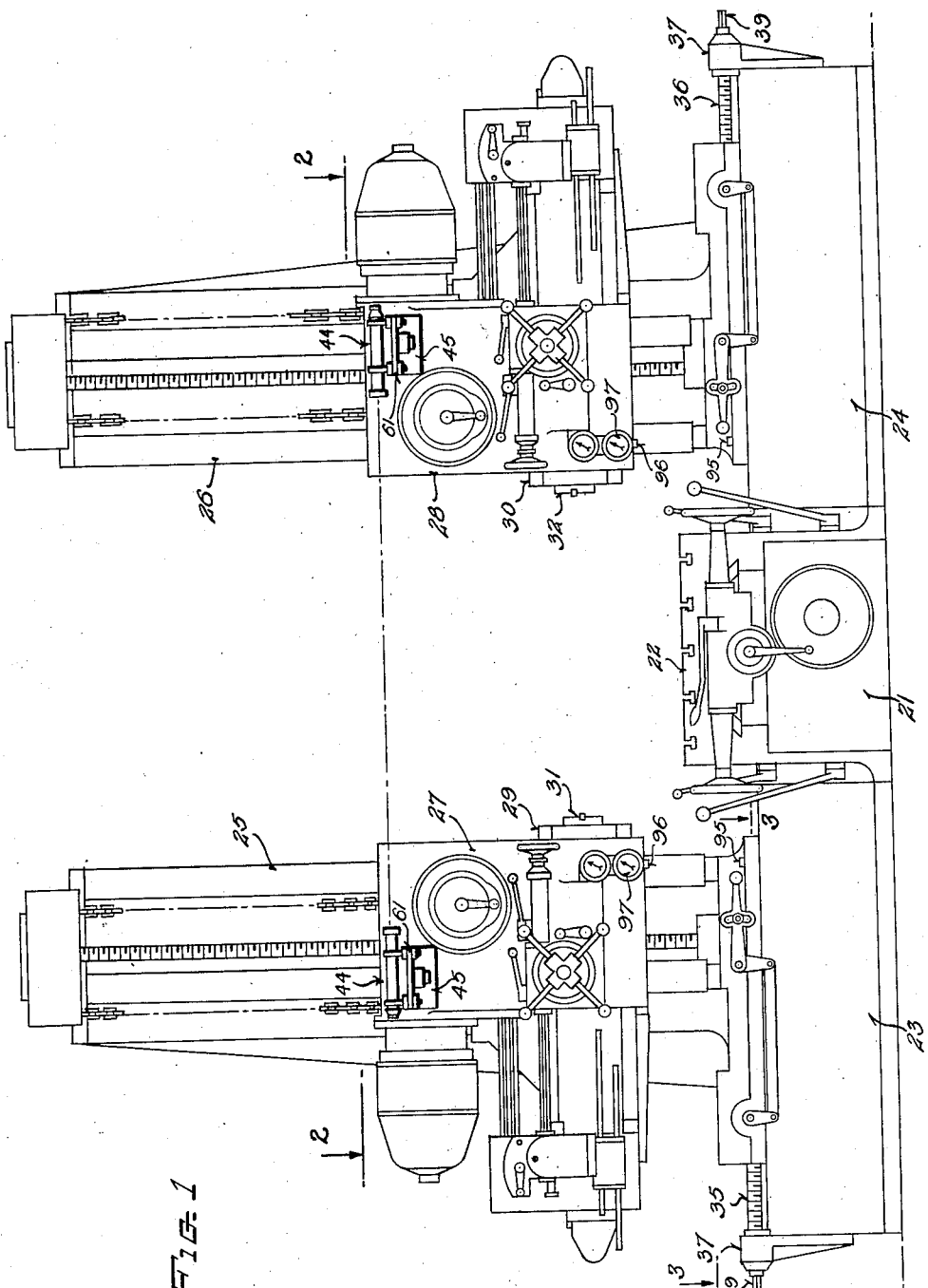

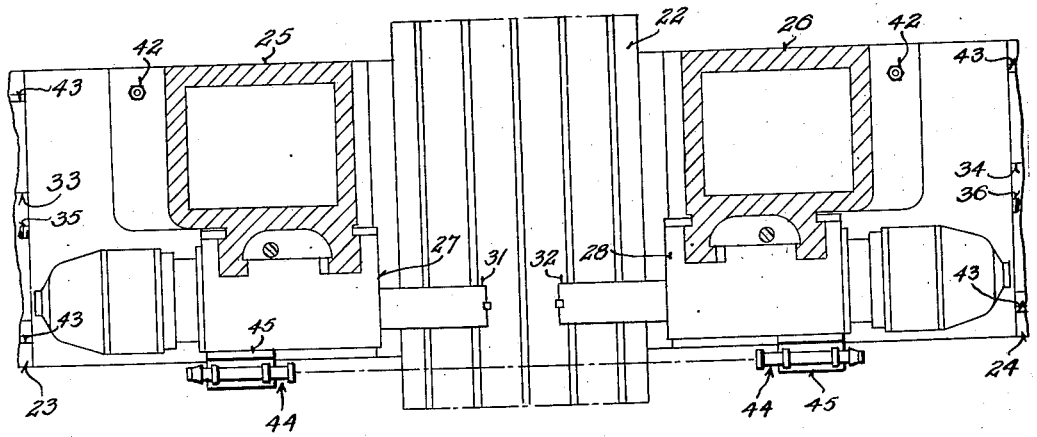
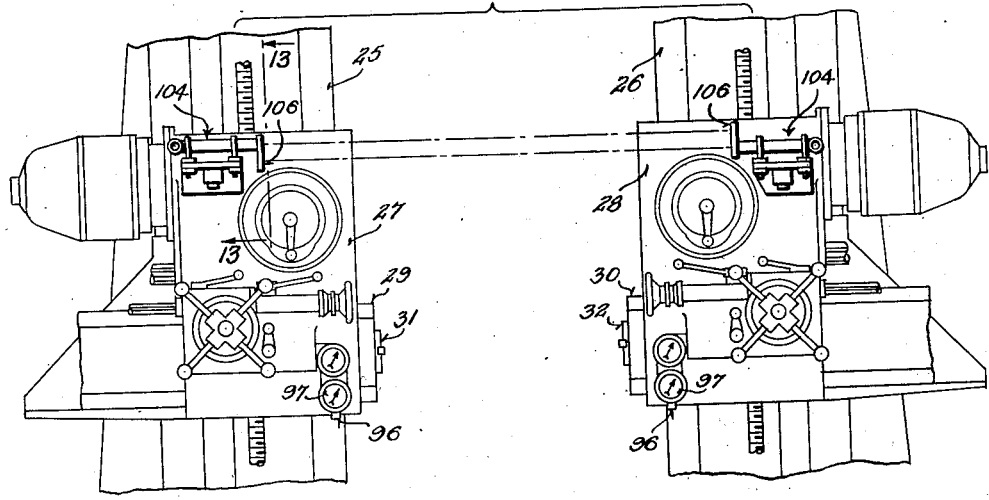
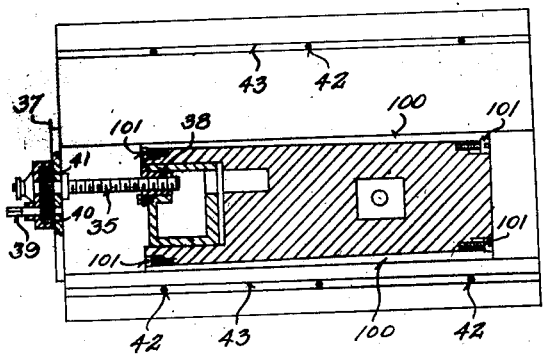

2,342,828

UNITED STATES PATENT OFFICE 2,342,828

METHOD AND APPARATUS FOR ALIGNING MACHINE ELEMENTS AND THE LIKE

Joseph B. Armitage, Wauwatosa, Charles O. Rothweiler, Milwaukee, and Theodore O. Salzer, Whitefish Bay, Wis.; said Armitage assignor to Kearney & Trecker Corporation, West Allis, Wis., a corporation of Wisconsin, and said Rothweiler and said Salzer assignors to David White Company, Milwaukee, Wis., a corporation of Wisconsin Application May 13, 1939, Serial No. 273,544

23 Claims. (Cl. 29—26)

This invention relates generally to means for positioning movable objects and more particularly to an improved method of and apparatus for aligning machine elements and the like.

A general object of the present invention is to provide an improved method of and improved apparatus for alignnig movable objects.

Another general object of the invention is to provide an improved optical system for aligning movable objects.

Another object of the invention is to provide improved collimating apparatus.

Another object of the invention is to provide an improved method of aligning machine elements.

Another object of the invention is to provide new and improved optical means for insuring accurate alignment of adjustable machine elements.

Another object is to provide a combined sighting telescope and collimator especially adapted for use in aligning movable objects.

Another object is to provide a combined sighting telescope and collimator adapted to be used in cooperating pairs sighting upon each other for establishing or verifying alignment.

Another object is to provide an improved optical system for establishing alignment including a pair of opposed cooperating combined sighting telescopes and collimators disposed to be sighted into each other.

Another object is to provide an improved aligning means in the form of a telescope mounted on each of two adjustable machine elements, each of said telescopes being adapted to be sighted upon a target positioned on the other of said adjustable machine elements.

Another object is to provide an improved optical system for a machine tool whereby the alignment of the machine may be checked at any time.

Another object is to provide a new method of maintaining the alignment of machine elements.

Another object is to provide a new method of and apparatus for accurately aligning machine tool elements operating upon opposite sides of a workpiece.

A further object is to provide an improved boring and milling machine presenting opposed tool spindles arranged to be adjusted into alignment for effecting coordinated machining operations on opposite sides of a workpiece and having improved means for checking the alignment of the spindles conveniently as the machining operation progresses.

According to this invention, movable objects are aligned optically by sighting a telescope on one object upon a target on the other object, the preferred arrangement including a combined sighting telescope and collimator instrument disposed on each object, the two instruments being directed to sight into each other. The telescopes of the instruments are each provided with the usual sighting reticule and each instrument is further provided with a target reticule so disposed as to be out of focus when sighting through the telescope but visible when sighted upon by the opposing telescope, the target reticule being in this instance properly illuminated and magnified by the associated objective lens in manner to function as a collimator. When applied to a machine tool, for example of the opposed spindle type, the instruments are adjusted into collimating relationship when the spindles are in mutual alignment. Accordingly, the alignment of the spindles may be verified at any time before or during a machining operation by sighting through the opposing telescopes in turn, and noting whether or not either of the sighting reticules has deviated from register with its cooperating target reticule.

Although the combined telescope and collimator instruments embodying the invention are illustrated and described herein as utilized in axially aligning the opposed spindles of a boring machine, it is to be understood that they may be adjusted to confirm any other predetermined relationship of the spindles and that they may likewise be utilized to establish or verify the relative position of various other objects with equal facility.

The foregoing and other objects and advantages of the present invention will become more fully apparent from the following detailed description of the exemplifying embodying apparatus shown in the accompanying drawings, in which—

Figure 1 is a general view in end elevation of a boring and milling machine provided with optical apparatus embodying the present invention for accurately aligning a pair of adjustable tool supporting elements on the machine;

Fig. 2 is a horizontal sectional view taken on line 2—2 of Fig. 1 showing the tool carrying elements and the optical instruments in aligned position;

Fig. 3 is a horizontal sectional view through one column of the machine taken on the line 3—3 of Fig. 1 showing means for effecting positioning of the column laterally or angularly with respect to the table and toward or from the table;

Fig. 4 is a fragmentary elevational view of the machine columns and tool carrying members, the latter being provided with aligning telescopes of a modified form;

Fig. 5 is an enlarged fragmentary elevational view of part of the right tool carrying element as shown in Fig. 1, showing in side elevation the preferred form of the associated aligning optical instrument;

Fig. 6 is an end elevational view of the instrument shown in Fig. 5, with parts broken away to show means for adjusting, clamping and anchoring it firmly in properly adjusted position on the tool carrying element;

Fig. 7 is a horizontal sectional view through the instrument taken on the line 7—7 of Fig. 5;

Fig. 8 is a diagrammatic view of the optical system of the two aligned instruments indicating the cooperative functioning when sighting one instrument on the other to insure proper alignment of the machine elements;

Fig. 9 is an enlarged vertical transverse sectional view taken on the line 9—9 of Fig. 7 showing the sighting reticule of one of the instruments and the means for adjustably supporting it;

Fig. 10 is another enlarged vertical transverse sectional view similar to Fig. 9 but taken on the line 10—10 of Fig. 7 showing the target reticule of the instruments and the means for adjustably supporting it;

Fig. 11 is an enlarged diagrammatic view of the field as seen through one of the instruments with the sighting reticule of the sighting instrument superimposed upon and registering with the target reticule of the target instrument indicating that the machine elements are in proper alignment;

Fig. 12 is a view generally similar to Fig. 11 but showing a modified form of the target reticule;

Fig. 13 is an elevational view taken on the line 13—13 of Fig. 4 showing the objective end of a telescope of modified form carrying an exterior target;

Fig. 14 is a fragmentary side elevational view of the objective end of the telescope shown in Fig. 13, modified to provide a magnifying lens superimposed upon the target; and Fig. 15 is an enlarged fragmentary elevational view of the target bracket shown in Figs. 13 and 14, showing a modified target as magnified by the lens.

For the purposes of clearly illustrating the method and apparatus used in effecting or verifying accurate alignment of a plurality of adjustable machine elements in accordance with this invention, exemplary aligning apparatus is shown in the accompanying drawings applied to a boring and milling machine of the double opposed spindle type, the machine being more fully described and claimed in the co-pending patent application of Joseph B. Armitage and Orrin W. Barker, Serial No. 268,030, filed April 15, 1939, which issued November 18, 1941, as Patent No. 2,263,404.

The boring and milling machine chosen for illustrative purposes and shown generally in Fig. 1 of the accompanying drawings, comprises essentially a hollow bed or base 21 constituting the foundation or main frame of the machine and carrying a work-supporting table 22 arranged for longitudinal reciprocatory movement. A pair of bed extensions 23 and 24 project laterally from the bed 21 and serve to support left and right upstanding columns or uprights 25 and 26, respectively. The columns 25 and 26 are disposed at opposite sides of the work-supporting table 22 and they serve to carry spindle supporting headstocks or saddles 27 and 28, respectively, each of the saddles being arranged for independent vertical sliding movement along ways formed on the forward vertically disposed face of its supporting column. Rams 29 and 30 are mounted in the saddles 27 and 28, respectively, for axial sliding movement toward and from each other in direction transversely of the table, and they in turn support rotatably mounted tool carrying spindles 31 and 32, respectively.

The columns 25 and 26 likewise are mounted for movement toward and from the table 22 on ways 33 and 34 respectively, formed on the upper surfaces of the corresponding bed extensions 23 and 24. For moving the columns along the ways, adjusting screws 35 and 36 are journalled in brackets 37 secured to the ends of the bed extensions 23 and 24, as best shown in Fig. 3, the extending parts of screws 35 and 36 having threaded engagement with feed nuts 38 mounted in the bases of the columns. Each of the screws 35 and 36 may be operated manually by means of a hand crank (not shown) which may be applied to the squared end of a shaft 39 on which a small spur pinion 40 is keyed, the pinion 40 being meshed with a larger gear 41 keyed to the adjusting screw 35. When the columns have been moved by means of the hand crank to the desired position of adjustment, they may be clamped to the bed extensions by means of clamping bolts 42 which pass through outwardly extending supporting flanges on the column and engage T slots 43 formed in the upper surfaces of the bed extensions 23 and 24.

In operating a combined boring and milling machine of this type, it is frequently desirable to perform machining operations simultaneously upon opposite sides of a workpiece mounted on the table 22 in order to effect coordinated results, such for instance as are required in turning or boring aligned trunnions or sockets on the opposite sides of a workpiece. For this purpose, it is important that the two opposed tool spindles 31 and 32 be brought into predetermined relationship, for instance axial alignment, and that their relationship be maintained within prescribed limits of accuracy throughout the machining operation.

Initial alignment of the spindles 31 and 32 may be effected in well known manner by applying suitable precision measuring instruments and gauges to the machine and then fitting the machine parts by scraping the ways and making other adjustments to insure parallelism and axial alignment of the spindles. After accurate alignment of the spindles has once been established, it may be verified or reestablished at any time in accordance with this invention, by optical means, thereby maintaining the required degree of accuracy. This is accomplished by means of a pair of sighting telescopes and cooperating targets mounted on the spindle supporting saddles 27 and 28 respectively and disposed to sight upon each other as indicated in the drawings, the axes of the telescopes being disposed parallel with the axes of their associated tool spindles. The sighting element of each instrument is arranged to cooperate with the target element of the other instrument in such manner that when the instruments are properly adjusted and the spindles are in accurate alignment, the two instruments will be in collimating relationship. Accordingly, if upon sighting through either instrument it indicates a deviation from exact collimation, it is evident that the spindles are not in accurate alignment and that further adjustment of the machine is necessary to perfect the alignment.

The preferred form of the optical apparatus for effecting or verifying alignment of the opposed tool carrying spindles 31 and 32 in accordance with the present invention, comprises a pair of combined telescope and collimator instruments 44 shown in Fig. 1 mounted on the front face of each saddle 27 and 28 in opposed cooperating relationship. The instruments 44 are each mounted on a bracket 45 which in turn is adjustably secured to the associated saddle 27 or 28 in manner to provide for accurately adjusting the instrument into predetermined relationship with the axis of its associated spindle. As shown in Fig. 6, a horizontally disposed slot 46 formed in each of the saddles provides a recess for receiving a key 47 which is anchored therein by means of cap screws 48. The bracket 45 is similarly provided with a horizontally disposed slot 49 adapted to receive the extending portion of the key 47 which projects from a supporting boss 50 formed on the face of the saddle. For the purpose of permitting some angular displacement of the bracket 45 with respect to a horizontal plane, a slight amount of clearance is allowed between the sides of the key 47 and the slot 49. The bracket 45 is provided with flange portions 51 and 52 extending upwardly and downwardly from the key 47, respectively. A pair of anchoring studs 53 fixed in the saddle extend through holes 54 formed in the flange portion 51, and a similar pair of studs 55 likewise anchored in the saddle pass through holes formed in the downwardly extending flange 52 of the bracket 45. A plurality of adjusting screws 56 are threaded through holes 57 formed in the upper and lower flanges 51 and 52 of the mounting bracket 45, with the ends of the several adjusting screws abutting the face of the boss 50. By reason of the threaded engagement between the adjusting screws 56 and the holes 57 in the bracket 45, the several screws 56 may be manipulated to effect tilting movement of the mounting bracket 45 about the key 47 to move the instrument horizontally, or to effect angular adjustment in a horizontal plane. After the adjustment by means of the screws 56 has been completed, the nuts on the studs 53 and 55 are tightened to clamp the bracket 45 rigidly to the saddle.

The horizontally disposed portion of the bracket 45 is provided with a vertically disposed bore 58 provided with a vertical keyway 59. A depending pin 60 formed on a horizontally disposed instrument carrying bar 61 is provided with a Woodruff keyway 62 to receive a Woodruff key 63 which is also fitted in the keyway 59 to fix the angular position of the bar 61 with the respect to the mounting bracket 45. The forward portion of the bracket 45 is provided with a kerf to adapt it to be contracted by a clamping bolt 64 which may be tightened to prevent angular displacement of the pin 60 within the bore 58. As best shown in Fig. 5, the bar 61 is provided with a pair of longitudinally spaced vertically disposed holes 65 which receive screw threaded rods 66. A pair of jam nuts 67 lie respectively above and below the bar 61 on each rod 66 to permit vertical adjustment of the rod with respect to the bar 61. The upper end of each rod 66 is provided with a yoke 68 which is adapted to receive and support the instrument 44 in well known manner. A retaining arm 69 which is pivotally mounted on a pin 70 carried by each yoke 68 is adapted to encompass the upper portion of the instrument and a screw threaded clamping means 71 cooperates with the yoke 68 to retain the free end of the arm 69 in retaining or clamping position. By suitably manipulating the jam nuts 67 on the instrument supporting rods 66, the instrument 44 may be moved vertically or adjusted angularly in a vertical plane.

After the tool spindles 31 and 32 have been accurately aligned as previously explained, each of the instruments 44 is adjusted by manipulating the various adjusting screws and nuts just described to bring the two instruments into alignment or collimation, thereby establishing coordinating relationship with the spindles. The alignment of the spindles may then be verified at any time by sighting through each instrument in turn upon the other instrument to determine whether or not they have deviated from collimation. Since it is desirable to illuminate the instrument being sighted upon, a light supporting bracket 72 is hingedly mounted on the rear supporting yoke 68 of each instrument, as shown in Fig. 5. The bracket 72 is provided with a removable hood 73 having a forwardly directed opening 74 adapted to project light from a bulb 75 (Fig. 8) into the eyepiece of the collimator instrument 44 when the light supporting bracket is swung upwardly into the lighting position shown dotted in Fig. 5.

The internal structure of the combined telescope and collimator instrument may best be seen by referring to Fig. 7 which is a horizontal longitudinal sectional view through the instrument. As shown, the instrument 44 comprises a tubular body portion or casing 75 carrying at its forward end an objective lens 76, the lens being mounted in a tubular member 77 that is telescopically arranged on the outside of the body portion 75. A second tubular member 78 of smaller diameter is secured to the member 77 and is adapted for axial sliding movement within the casing 75. A rack 79 is secured to the inner tube 78 in a position to mesh with a pinion 80 formed on a shaft 81 which is journalled in a bracket 82 which extends laterally from the tube 75. The shaft 81 is provided with a knurled knob 83 for turning it manually to effect movement of the objective lens 76 with respect to the fixed member 75 of the telescope. An eyepiece 84 is adjustably mounted within the other end of the tube 75 in the usual manner, the eyepiece being axially movable with respect to the fixed body portion 75 of the telescope to effect proper focusing upon a sighting reticule 85 mounted therein. The sighting reticule 85 is carried in an assembly which comprises an annular supporting element 86 provided with a centrally disposed circular opening 87 and carrying a pair of platinum wires 88 disposed at right angles to each other across the opening, the wires being normally positioned one in a horizontal plane and the other in a vertical plane to constitute the cross hairs of the sighting reticule, as shown in Fig. 9. The supporting member 86 is provided with a plurality of threaded laterally disposed apertures arranged at right angles to each other for receiving adjusting screws which pass through plates 89 and slots 90 formed in the tube 75. By loosening and tightening various of the adjusting screws, the sighting reticule may be adjusted horizontally or vertically in the tube 75. The reticule may also be adjusted angularly by loosening all of the several adjusting screws and effecting rotation of the reticule supporting member by moving the reticule assembly in the slots 90.

A target reticule assembly 91 lies forward of the sighting reticule 85 within the tube 75 and is similar thereto save for the form of the target which comprises four platinum wires 92 arranged in pairs disposed at right angles to each other, as shown in Fig. 10, the spacing between the respective wires of each pair being preferably about one-one thousandth of an inch, and the several wires each being about two-ten thousandths of an inch in diameter. The target reticule assembly 91 is supported within the tube 75 by means of adjusting screws similar to the screws which support the sighting reticule, and it may be adjusted therein transversely or angularly in similar manner.

In Fig. 8 the combined optical system of the two instruments is represented diagrammatically to illustrate the cooperative action obtained when sighting through one of the instruments into the other instrument. In this diagram the instrument at the right is being utilized as the sighting telescope while the instrument at the left functions as the target collimator, although it is to be understood that in checking the alignment of the machine the operator sights through first one instrument and then the other upon the opposing target in determining whether or not the spindles 31 and 32 are disposed in accurate alignment.

In preparing the machine for supporting the spindles in accurate alignment and in adjusting the aligning apparatus the first step is to assemble the machine bed 21, table 22, bed extensions 23 and 24 and the upright columns 25 and 26 by leveling and squaring operations and by scraping the bearing surfaces in such manner that the bearing faces of the columns are disposed in a vertical transverse plane perpendicular to the line of travel of the table 22. The saddles 27 and 28 are then fitted to the columns 25 and 26 and the ram assemblies 29 and 30 are fitted in the front of the saddles in manner to support the tool spindles 31 and 32 in a vertical plane transverse to the table and with their axes parallel with the surfaces of the table. Test bars are then fitted in the spindles and the saddles are adjusted vertically until the spindles are disposed in accurate axial alignment as shown by a sensitive dial indicator associated with the test bars.

With the spindles thus arranged in precise axial alignment, the opposing instruments 44 are collimated to correlate them with the spindles. To this end, the operator first sights through one of the instruments 44 as indicated in Fig. 8, and adjusts the eyepiece 84 to focus it upon the cross wires of the sighting reticule 85 in manner to make it clearly visible in the field of vision. Since the target reticule 91 is spaced from the sighting reticule, the focusing operation throws its cross wires out of focus rendering them invisible when sighting through the instrument as a telescope. After the eyepiece has been adjusted, a helper manipulates the knurled knob 83 on the other instrument, shown at the left in Fig. 8, in manner to focus its objective lens 76 upon the cross wires of the target reticule 91, the focusing operation being directed by the operator while sighting through the right hand telescope, the objective lens of the sighting telescope being adjusted by the operator if necessary to perfect the focus upon the target. After each instrument has been focused upon the other in this manner, the instruments are adjusted into mutual collimation by manipulating the adjusting screws associated with the bracket 45 as previously described until the sighting cross hair reticule of each instrument is superimposed upon and registers with its cooperating target double cross hair reticule in the other instrument, as shown in Fig. 11, a level 93 associated with each instrument being observed meanwhile to determine whether or not the instruments are directed horizontally.

With the aligning instruments 44 thus accurately collimated simultaneously with accurate alignment of the spindles as indicated by precision instruments, it is apparent that the spindle supporting saddles 27 and 28 may now be displaced vertically along the columns, as may be required in taking transverse cuts on a workpiece, with the assurance that the accurately aligned relationship of the spindles may be reestablished and verified at any predetermined position relative to the table 22. Accordingly, after a transverse cutting operation has been completed, each of the saddles 27 and 28 may be accurately positioned with the spindles 31 and 32 at equal predetermined distances above the table 22, by inserting a measuring rod, not shown, of accurately predetermined length between a stationary abutment 95 fixed on the base of each column and an aligned movable abutment 96 carried by each saddle and associated with a sensitive dial indicator 97. After each spindle has been thus positioned by reference to the associated dial indicator 97, the realignment of the spindles may be verified by sighting through the instruments 44 in turn as previously explained, since any misalignment is indicated by failure of the sighting reticule of one or the other telescope to register with its cooperating collimator target reticule.

With the spindles 31 and 32 established in accurate alignment, the predetermined drilling, boring or turning operations may be performed simultaneously upon opposite sides of a workpiece carried on the table 22. To insure that the alignment of the spindles is maintained within predetermined limits during the machining operation, the operator may sight through the instruments 44 in turn from time to time for the purpose of immediately detecting any deviation from accurate mutual alignment.

In the event that the cooperating sighting and target reticules indicate equal displacement in vertical direction when sighting through either telescope, the alignment may be corrected by moving one or the other of the saddles 27 and 28 up or down as may be necessary to reestablish the alignment as indicated in Fig. 1. Likewise, if the reticules of both instruments indicate equal degrees of misalignment in horizontal direction, the alignment may be correctd by adjusting one or the other of the columns upon its supporting bed extension. For this purpose, each column is fitted in the ways of its supporting bed extension by means of a pair of tapered gibs 100, as shown in Fig. 3, each gib being provided in each end with an adjusting screw 101. For adjusting the horizontal position of a spindle, one of the gibs 100 is moved to the right by its adjusting screws 101, and the other gib is moved a corresponding amount to the left, the effect of the movement being observed through the instruments and the movement continued until the reticules again register and indicate that the instruments and the spindles are again in alignment as indicated in Fig. 2.

In the event that the sighting reticule of one telescope is out of register with its cooperating target reticule, while the other sighting reticule is in register with its target or indicates only a slight misalignment it is evident that one of the spindles is misaligned angularly. To correct angular misalignment in a horizontal plane, the gibs 100 of the misaligned spindle column are scraped or otherwise fitted to turn the column slightly in the direction to reestablish alignment. To correct angular misalignment in a vertical plane the bearing surfaces of the saddle carrying the misaligned spindle are scraped in similar manner or otherwise adjusted to turn the saddle slightly and reestablish accurate alignment.

A modified form of the aligning apparatus is illustrated in Fig. 4 wherein the combined telescope and collimator instruments 44 are replaced by purely sighting telescopes 104. Each of the telescopes 104 is provided with the usual sighting reticule and carries a separate external target 105, preferably in the form of cross marks inscribed on a bracket 106 extending transversely from the telescope tube adjacent to the objective lens mounting, as shown in Fig. 13. In utilizing this type of aligning apparatus, it is desirable that the telescopes be offset either in a horizontal or vertical plane a sufficient distance to compensate for the distance between the center-lines of the telescope and the target, as indicated in Fig. 4. The operation of sighting one telescope upon the target of the other requires the proper focusing of the eyepiece on the sighting reticule and the focusing of the objective lens upon the target. Since the distance between the objective lens and the cooperating target remains substantially constant, the variation between column spacing being relatively small, it is ordinarily not necessary to change the focus of the telescopes once they have been adjusted. The process of effecting and verifying the alignment of the tool spindles 31 and 32 by means of this modified apparatus is essentially the same as that explained in connection with the preferred instruments 44.

By way of facilitating the operation and improving the accuracy in using the modified form of telescope with the exterior target as just described, it is desirable in some instances to apply a magnifying lens 107 over the cross marks of the target 105, as shown in Figs. 14 and 15.

As a further modification, the target reticule for the preferred instrument 44 may in the form of a transparent glass disc 108, shown in Fig. 12, provided with a plurality of recticulated lines 109 and 110 etched into the glass and disposed respectively in parallel horizontal and parallel vertical planes, the lines being accurately spaced in manner to indicate the extent of any misalignment.

From the foregoing description and explanation of the operation of the illustrative apparatus embodying the invention, it is apparent that there has been provided convenient and highly effective apparatus for and a new method of establishing and verifying the alignment of movable objects such as machine tool members and the like with facility and with a high degree of accuracy.

Although the preferred form of the embodying apparatus has been described in considerable detail in fully disclosing a practical application of the invention, it is to be understood that the modified structures shown and various other modifications of the apparatus may be utilized to advantage without departing from the spirit and scope of the invention as defined in the subjoined claims.

The principles of this invention having now been fully explained in connection with the foregoing description of illustrative embodying apparatus, we hereby claim as our invention:

1. In a machine tool having a base, two upstanding columns mounted on said base, a tool head slidably mounted on each of said columns; and a tool spindle rotatably supported by each of said tool heads; the combination with means for accurately positioning said tool spindles, including precision measuring apparatus disposed to indicate accurately the positions of each of said tool heads relative to said base, of means for accurately checking the relative positions of said tool spindles, including a combined sighting telescope and collimator instrument mounted on each of said tool heads and so disposed that the telescope portion of the instrument on one head is directed into and cooperates with the collimator portion of the instrument on the other head, the arrangement being such that when said spindles are accurately positioned in predetermined relationship said instruments will be collimated.

2. A machine tool comprising a base, a pair of spindle supporting heads movably mounted on said base, a tool spindle rotatably mounted in each of said heads said spindles being arranged in opposed relationship, means for adjusting said heads to bring said spindles into axial alignment, and means for verifying the alignment of said spindles including a combined sighting telescope and collimator instrument mounted on each of said spindle heads, the arrangement being such that when said spindles are in alignment said instruments will be in collimating relationship.

3. In a machine tool provided with two rotatable spindles arranged to be positioned in axial alignment, the combination with means for adjusting the positions of said spindles, of means for checking the alignment thereof including an optical instrument associated with each spindle, said instruments being directed upon each other and each instrument including a sighting reticule and a target reticule, the arrangement being such that when the spindles are in accurate alignment the sighting reticule of each instrument will be focused upon and register with the target reticule in the opposing instrument.

4. In a machine, the combination with movable parts adapted to be positioned in accurately predetermined relationship, and means for accurately positioning each of said parts, of means for verifying the relative position of said parts including a combined sighting telescope and collimator instrument mounted on each of said parts and so disposed that the sighting telescope portion of the instrument on one part is directed into and cooperates with the collimator portion of the instrument on another part, the arrangement being such that when said parts are accurately positioned in their predetermined relationship said instruments will indicate mutual collimation.

5. In a machine tool having relatively movable elements, the combination with means for accurately adjusting the positions of said elements, of means for accurately checking the relative position of said elements, said checking means comprising a pair of telescopes mounted respectively on said movable elements and disposed in opposed axial alignment to sight into each other, said telescopes each comprising an objective lens, an eyepiece, a sighting reticule, and a target reticule, said reticules being so positioned in said telescopes that upon sighting through either one of said telescopes into the other the sighting reticule in the sighting telescope is in focus and the target reticule of the opposing telescope is in focus, the arrangement being such that the target reticule is seen through its associated objective lens magnified and superimposed upon the sighting reticule of the sighting telescope, whereby the relative position of said movable elements may be checked by observing the manner in which the sighting reticule of each telescope registers upon the target reticule of the opposing telescope.

6. In an apparatus for aligning movable objects, a pair of combined sighting telescope and collimator instruments adapted to be operated with each instrument sighting into the other for cooperatively aligning two objects, the combination with a telescope lens system including an objective lens and a sighting reticule in each instrument, of a target reticule so disposed in each instrument as to be out of focus and invisible when sighting through said instrument but visible when sighted upon through its objective lens by said cooperating instrument when trained into said objective lens.

7. The method of operating a machine tool having movable spindle heads carrying opposed tool spindles and collimating telescopes, that comprises positioning said heads by means of precision measuring instruments to bring said tool spindles into parallelism and into precise axial alignment, then adjusting said telescopes relative to their respective tool heads to bring them into precise collimation corresponding with the aligned relationship of said spindles, moving one or both of said tool heads to effect a transverse cutting operation while maintaining said tool spindles in parallelism, then moving said tool heads to bring said spindles into axial alignment at a predetermined position, sighting through said telescopes to verify the alignment of said spindles, feeding one or both of said spindles axially in performing a boring operation, and sighting through said telescopes from time to time as the boring operation proceeds for the purpose of detecting any misalignment of said spindles which may occur during the course of said boring operation.

8. The method of establishing and maintaining alignment of two machine tool spindles mounted for relative movement in tool heads provided with collimating telescopes, that comprises positioning said tool heads by means of precision measuring instruments to bring said tool spindles into parallelism and then into precise axial alignment, then adjusting each of said telescopes relative to its associated tool head to bring said telescopes into precise mutual collimation, then operating said machine in manner displacing said heads to positions in which said spindles are misaligned, moving said heads under the guidance of said telescopes to realign said spindles, then moving said tool spindles axially in effecting a boring operation, and sighting through said telescopes from time to time as said boring operation proceeds to detect any misalignment of said spindles which may occur during said boring operation.

9. In a machine tool including a bed, a work-supporting table, a plurality of vertically disposed columns supported on said bed, and a vertically adjustable tool carrying element on each of said columns, the combination of a telescope on each of said elements and a target on each of said elements, whereby accurate alignment of both of said tool carrying elements may be effected by sighting the telescope on each of said elements on the target on the other of said elements.

10. In a machine tool including a bed, a work-support, a vertically disposed column on said bed on each side of said work-support, a plurality of gibs providing means for angular and lateral displacement of said columns on said bed, vertically disposed guide ways on each of said columns, a tool carrying element adapted to be clamped in adjusted position on said ways on each of said columns, means for adjusting the elevation of each of said tool carrying elements, and means for verifying the adjustment of said elements comprising the combination of a telescope on each of said tool carrying elements and a target on each of said tool carrying elements, whereby accurate alignment of said tool carrying elements may be effected by sighting the telescope on each of said elements on the target on the other of said elements.

11. In a machine tool having relatively movable elements, the combination with means for accurately positioning said elements, of means for checking the relative position of said elements comprising a telescope mounted on each of said elements, said telescopes being directed upon each other and each telescope having a sighting reticule and a target reticule, the arrangement being such that when sighting through either telescope the sighting reticule of the sighting telescope appears superimposed upon the target reticule of the other telescope.

12. In a machine, the combination with movable parts adapted to be positioned in accurately predetermined relationship, and means for accurately positioning each of said parts, of means for verifying the relative position of said parts including a combined sighting telescope and collimating instrument mounted on each of said parts, each of said instruments comprising a telescope lens system including an objective lens a sighting reticule and a separate target reticule, said target reticule being so positioned as to be out of focus and invisible when sighting through said telescope but visible when sighted upon through the other telescope when the instruments are so disposed that the sighting telescope of each instrument is directed into the objective lens of the other instrument, the arrangement being such that when said machine parts are accurately positioned in their predetermined relationship the sighting reticule of each of said telescopes will register with the cooperating target reticule of the opposing telescope indicating mutual collimation of said instruments.

13. Apparatus for aligning movable objects, comprising a pair of similar telescopes adapted to be carried respectively by the objects to be aligned and disposed to sight into each other, each of said telescopes comprising an objective lens an eyepiece and a sighting reticule so arranged that said sighting reticule is visible when sighting through said telescope, and each of said telescopes having a target reticule and means for illuminating said target reticule so arranged that said target reticule is visible when sighting into said telescope through said cooperating telescope, said target reticule appearing magnified and superimposed upon the sighting reticule of said sighting telescope.

14. In a machine tool having a base, two upstanding columns mounted on said base, a tool head slidably mounted on each of said columns, and a tool spindle rotatably supported by each of said tool heads, the combination with means for accurately positioning said tool spindles, including precision measuring apparatus disposed to indicate accurately the positions of each of said tool heads relative to said base, of means for accurately checking the relative positions of said tool spindles, including a combined sighting telescope and collimator instrument mounted on each of said tool heads and so disposed that the telescope of the instrument on one head is directed upon and cooperates with the collimator of the instrument on the other head, the arrangement being such that when said spindles are accurately positioned in predetermined relationship said telescopes will both register accurately upon their cooperating collimators.

15. In a machine tool having two movable elements, means for positioning said elements in predetermined relationship comprising a telescope mounted on the first of said elements and a cooperating target mounted on the second of said elements, a telescope mounted on said second element and a cooperating target mounted on said first element, and means for moving each of said movable elements, whereby said elements may be moved in manner to direct each telescope accurately upon its cooperating target thereby bringing said elements into accurate alignment.

16. A boring and milling machine comprising a base, a table slidably mounted on said base for reciprocatory movement, a pair of upstanding columns mounted on said base at opposite sides of said table, a pair of spindle heads slidably mounted for vertical movement on said columns respectively, a spindle carried by each spindle head said spindles being arranged in opposed relationship and adapted to be disposed in axial alignment by appropriately positioning said spindle heads, and means for aligning said spindles including a telescope and a target carried by each spindle head, the arrangement being such that the spindles will be in accurate alignment when the spindle heads are so positioned that each telescope is directed upon the target carried by the opposing spindle head.

17. In a machine tool having a base, two upstanding columns mounted on said base, a tool head slidably mounted on each of said columns, and a tool spindle rotatably supported by each of said tool heads, the combination with means for positioning accurately said tool spindles, including precision measuring apparatus disposed to indicate accurately the positions of each of said tool heads relative to said base, of means for checking accurately the relative positions of said tool spindles, including a reticuled sighting telescope and a target mounted on each of said tool heads and so disposed that the telescope on one head is directed upon and cooperates with the target on the other head, the arrangement being such that when said spindles are accurately positioned in predetermined relationship the reticules of said telescopes will both register accurately upon their cooperating targets.

18. An apparatus for aligning movable objects, comprising a pair of cooperating telescopes, each telescope including an eyepiece, an objective lens, a sighting reticule disposed between said eyepiece and said objective lens and in focus with said eyepiece, and a target reticule disposed between said eyepiece and said objective lens in position to be out of focus with said eyepiece and in focus with said objective lens, the arrangement being such that when said telescopes are sighted into and focused upon each other to establish mutual alignment, the sighting reticule of each telescope will appear superimposed upon the magnified image of the cooperating target reticule of the opposing telescope.

19. Apparatus for aligning movable objects including a pair of cooperating combined sighting telescope and collimator instruments, each instrument comprising a tube, an objective lens mounted in one end of said tube, an eyepiece mounted in the other end of said tube, a sighting reticule disposed in said tube between said eyepiece and said objective lens in position to be visible when sighting through said telescope, and a target reticule disposed in said tube between said eyepiece and said objective lens in position to be invisible when sighting through said telescope, said target reticule in each instrument being so positioned that it is visible when sighted upon by the other instrument through its associated objective lens.

20. In a machine tool having relatively movable elements, mechanical means for adjusting accurately the relative positions of said elements including precision measuring apparatus, and optical means for checking subsequently the relationship of said elements, said checking means comprising a telescope mounted on one of said elements and directed upon a target carried by the other of said elements and a telescope mounted on the second element and directed upon a target carried by the first element, the arrangement being such that when said elements are adjusted to their predetermined relative positions said telescopes will register accurately upon their respective targets.

21. An apparatus for aligning movable objects, including a pair of similar telescopes adapted to be carried respectively by the objects to be aligned and disposed to sight into each other, each of said telescopes comprising an objective lens and a sighting reticule so arranged that said sighting reticule is visible when sighting through said telescope, and each of said telescopes having a target reticule which is visible when sighting into said telescope through said cooperating telescope, said target reticule appearing superimposed upon the sighting reticule of said sighting telescope.

22. An apparatus for aligning movable objects, including a pair of similar telescopes adapted to be carried respectively by the objects to be aligned and disposed to sight into each other, said telescopes each comprising an objective lens and a sighting reticule so arranged that said sighting reticule is visible when sighting through said telescope, each of said telescopes having a target reticule which is visible when sighting into said telescope through said cooperating telescope, and means for illuminating each target reticule, said target reticule appearing superimposed upon the sighting reticule of said sighting telescope.

23. In a machine tool having two relatively movable elements, means for aligning said elements in predetermined relationship, comprising a combined sighting telescope and collimator instrument mounted on each of said elements, said instruments being directed upon each other, the arrangement being such that when said elements are moved into precise alignment said instruments will be in collimating relationship.

JOSEPH B. ARMITAGE.
CHARLES O. ROTHWEILER.
THEODORE O. SALZER.